US011095195B2

(12) United States Patent
Broadbridge

(10) Patent No.: US 11,095,195 B2
(45) Date of Patent: Aug. 17, 2021

(54) METHOD AND ARRANGEMENT FOR ASSEMBLING AN ELECTRIC MOTOR OR GENERATOR

(71) Applicant: PROTEAN ELECTRIC LIMITED, Surrey (GB)

(72) Inventor: Samuel Broadbridge, Surrey (GB)

(73) Assignee: PROTEAN ELECTRIC LIMITED, Surrey (GB)

( * ) Notice: Subject to any disclaimer, the term of this patent is extended or adjusted under 35 U.S.C. 154(b) by 227 days.

(21) Appl. No.: 16/329,104

(22) PCT Filed: Sep. 1, 2017

(86) PCT No.: PCT/GB2017/052539
§ 371 (c)(1),
(2) Date: Feb. 27, 2019

(87) PCT Pub. No.: WO2018/046893
PCT Pub. Date: Mar. 15, 2018

(65) Prior Publication Data
US 2019/0229596 A1 Jul. 25, 2019

(30) Foreign Application Priority Data
Sep. 8, 2016 (GB) ...................... 1615255

(51) Int. Cl.
*H02K 15/02* (2006.01)
*H02K 11/30* (2016.01)
(Continued)

(52) U.S. Cl.
CPC .............. *H02K 15/028* (2013.01); *H02K 1/30* (2013.01); *H02K 9/22* (2013.01); *H02K 11/30* (2016.01); *H02K 15/03* (2013.01); *H02K 15/12* (2013.01)

(58) Field of Classification Search
CPC . H02K 1/30; H02K 9/22; H02K 11/30; H02K 15/028; H02K 15/03; H02K 15/12
See application file for complete search history.

(56) References Cited

U.S. PATENT DOCUMENTS 4,151,430 A    4/1979  Stark
4,697,114 A *  9/1987  Amemiya ............ H02K 1/2773
                                                29/598

FOREIGN PATENT DOCUMENTS

CA      2 279 629      *  4/2008
CN      202276253 U    *  6/2012
(Continued)

OTHER PUBLICATIONS

European Patent Office; International Search Report; dated Dec. 6, 2017; WIPO; Rijswijk.
(Continued)

*Primary Examiner* — Carl J Arbes
(74) *Attorney, Agent, or Firm* — Nolte Lackenbach Siegel

(57) ABSTRACT

A method of assembling an electric motor or generator having an annular first element mounted on a circumferential mounting surface of a second element, the method comprising placing a heating coil within an inner annular surface of the annular first element; applying a current to the heating coil to heat the inner annular surface of the annular first element to a temperature that results in the inner annular surface of the annular first element increasing in diameter to allow the annular first element to be mounted on or over the circumferential mounting surface of the second element; and cooling the annular first element to form an interference fit between the annular first element and the circumferential mounting surface of the second element.

24 Claims, 11 Drawing Sheets

(51) Int. Cl.
    *H02K 1/30*          (2006.01)
    *H02K 9/22*          (2006.01)
    *H02K 15/03*        (2006.01)
    *H02K 15/12*        (2006.01)

(56) References Cited

FOREIGN PATENT DOCUMENTS

| | | | |
|---|---|---|---|
| CN | 102412670 U | * | 11/2013 |
| CN | 104263890 B | * | 8/2016 |
| EP | 0645873 A1 | | 3/1995 |
| EP | 1833139 A2 | | 9/2007 |
| GB | 2482539 A | | 2/2012 |
| GB | 2532193 A | | 5/2016 |
| JP | H06319243 A | | 11/1994 |
| JP | 2015042014 A | | 3/2015 |
| WO | 2015040482 A2 | | 3/2015 |

OTHER PUBLICATIONS

European Patent Office; Written Opinion of the International Searching Authority;dated Mar. 15, 2018; WIPO; Munich.
Intellectual Property Office; Combined Search and Examination Report; dated Oct. 20, 2016; IPO; South Wales.
Intellectual Property Office; Exam Report Standard; dated Nov. 23, 2018; IPO; South Wales.
Intellectual Property Office; Search Report First; dated Oct. 19, 2016; IPO; South Wales.

* cited by examiner

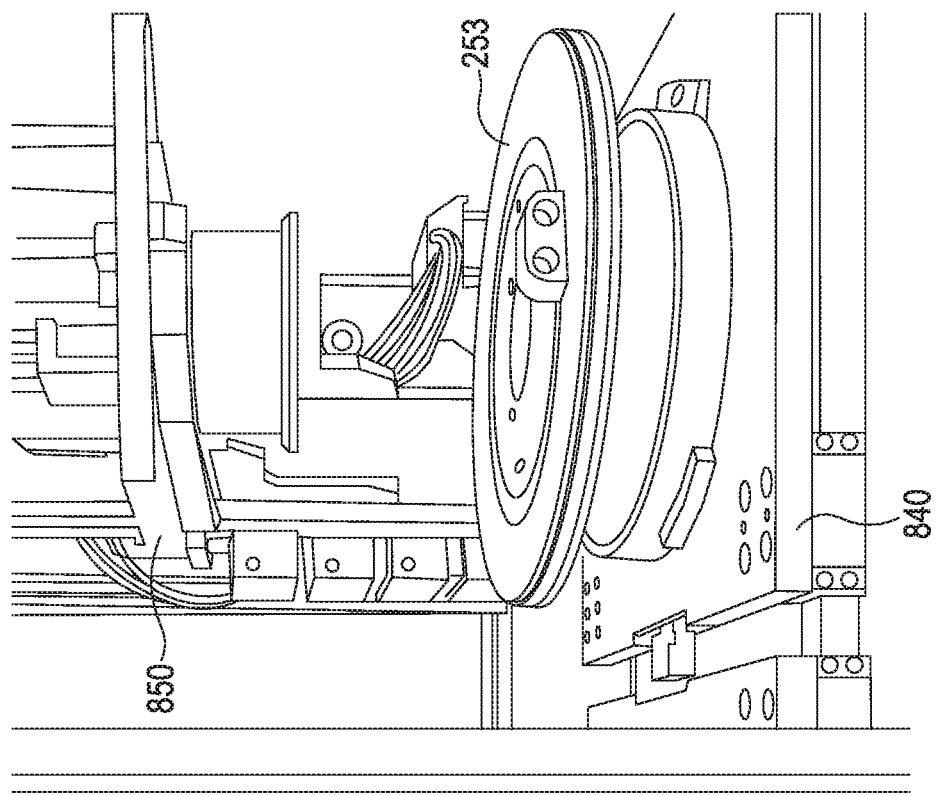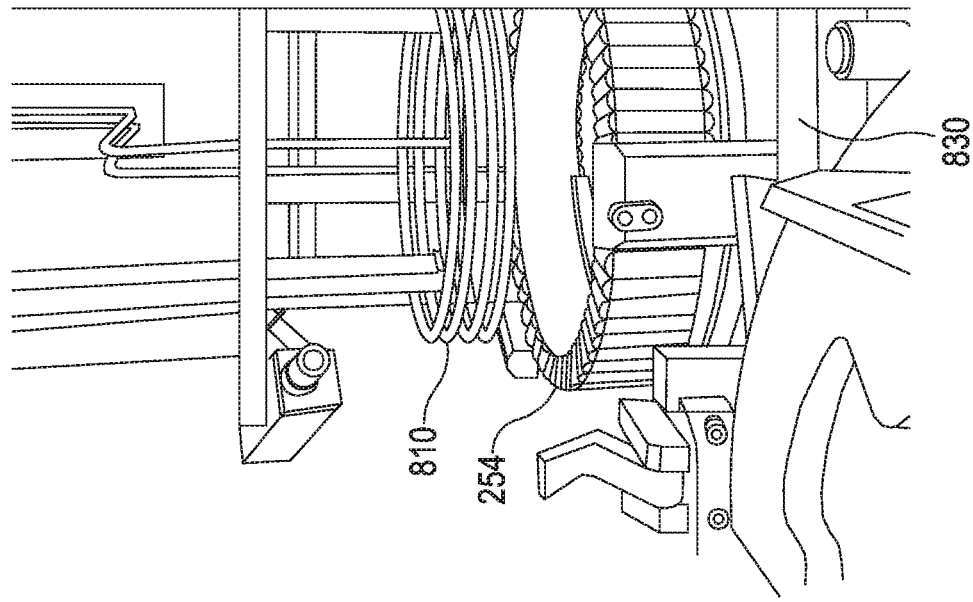
Fig. 8

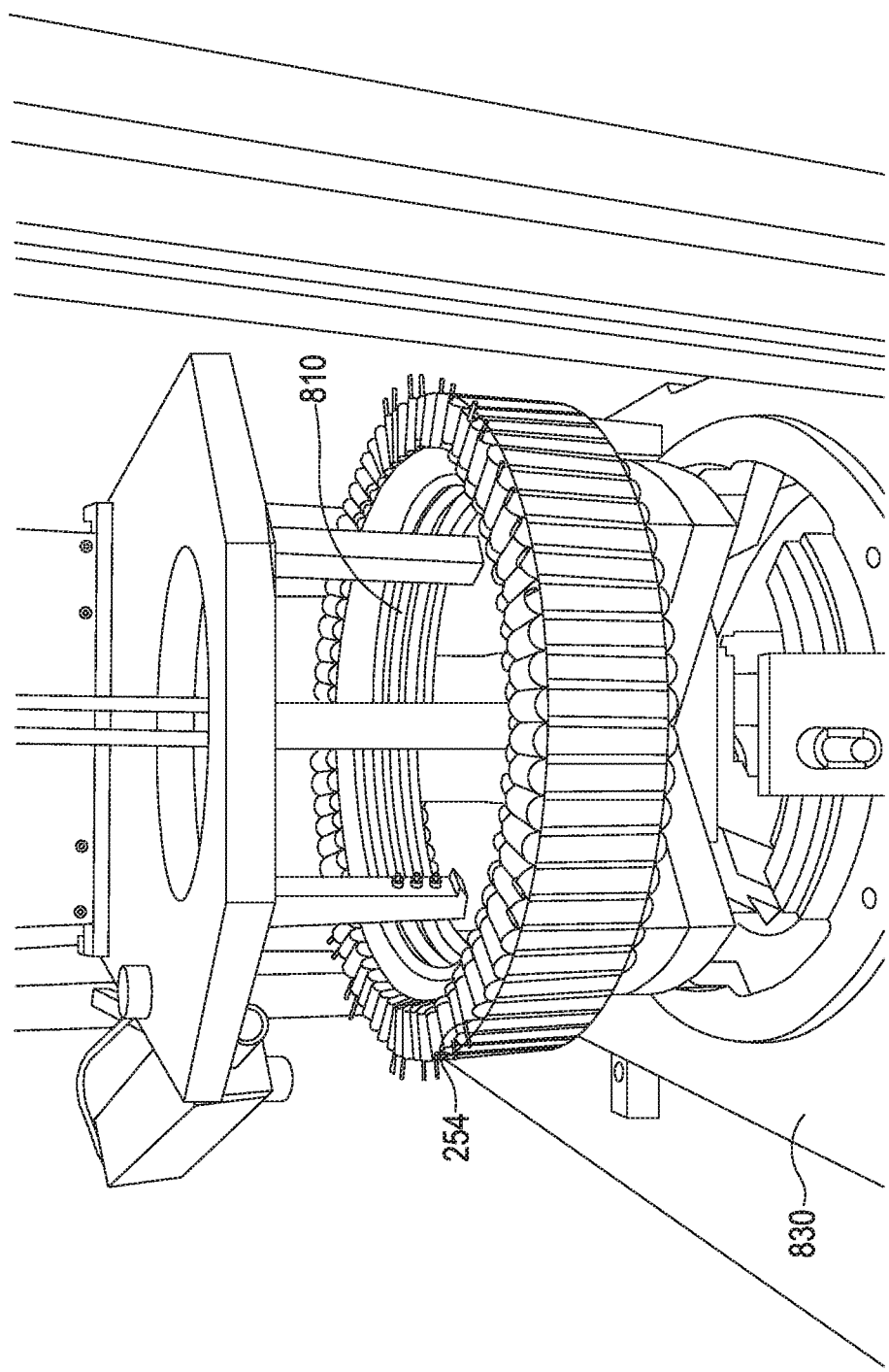

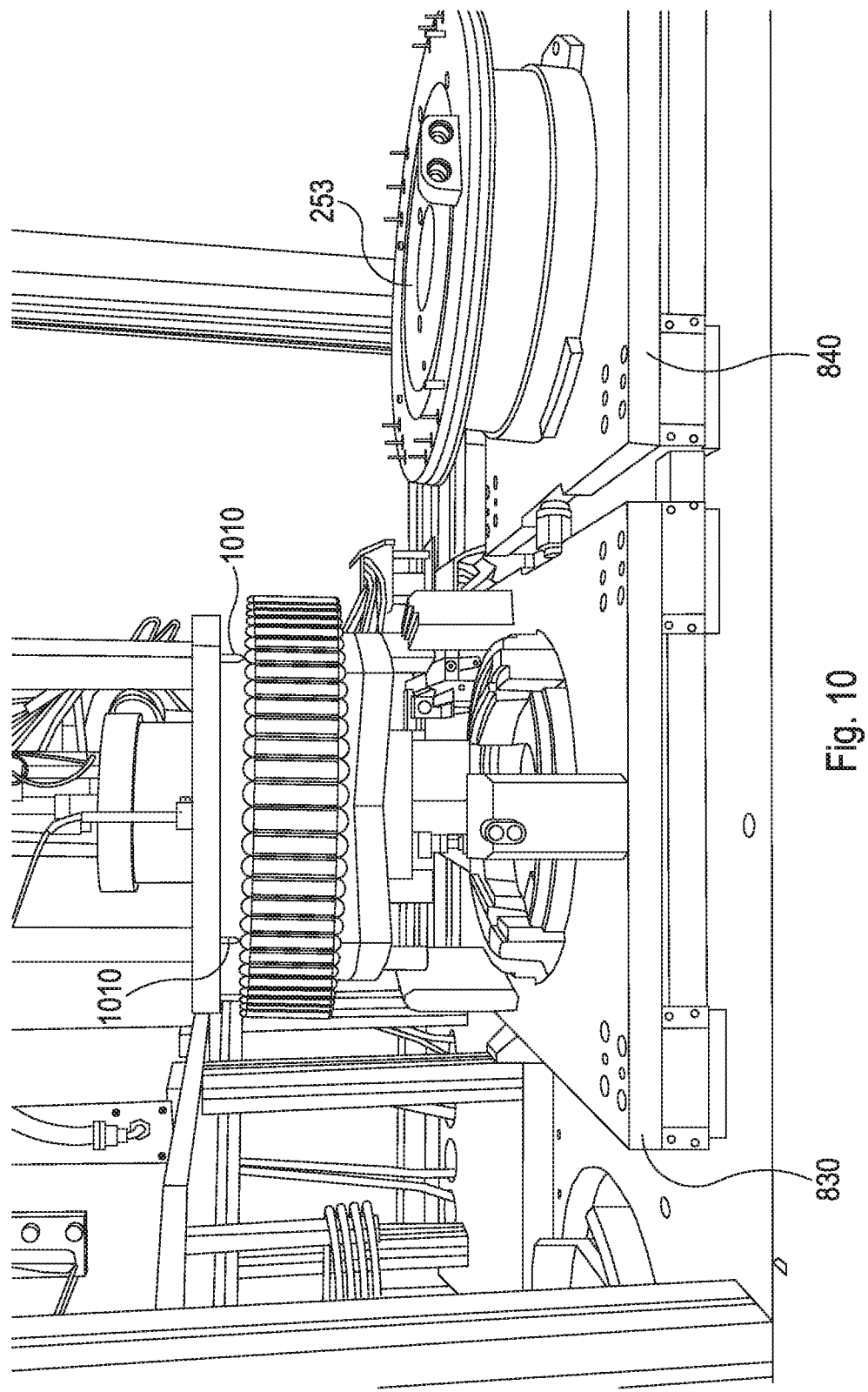

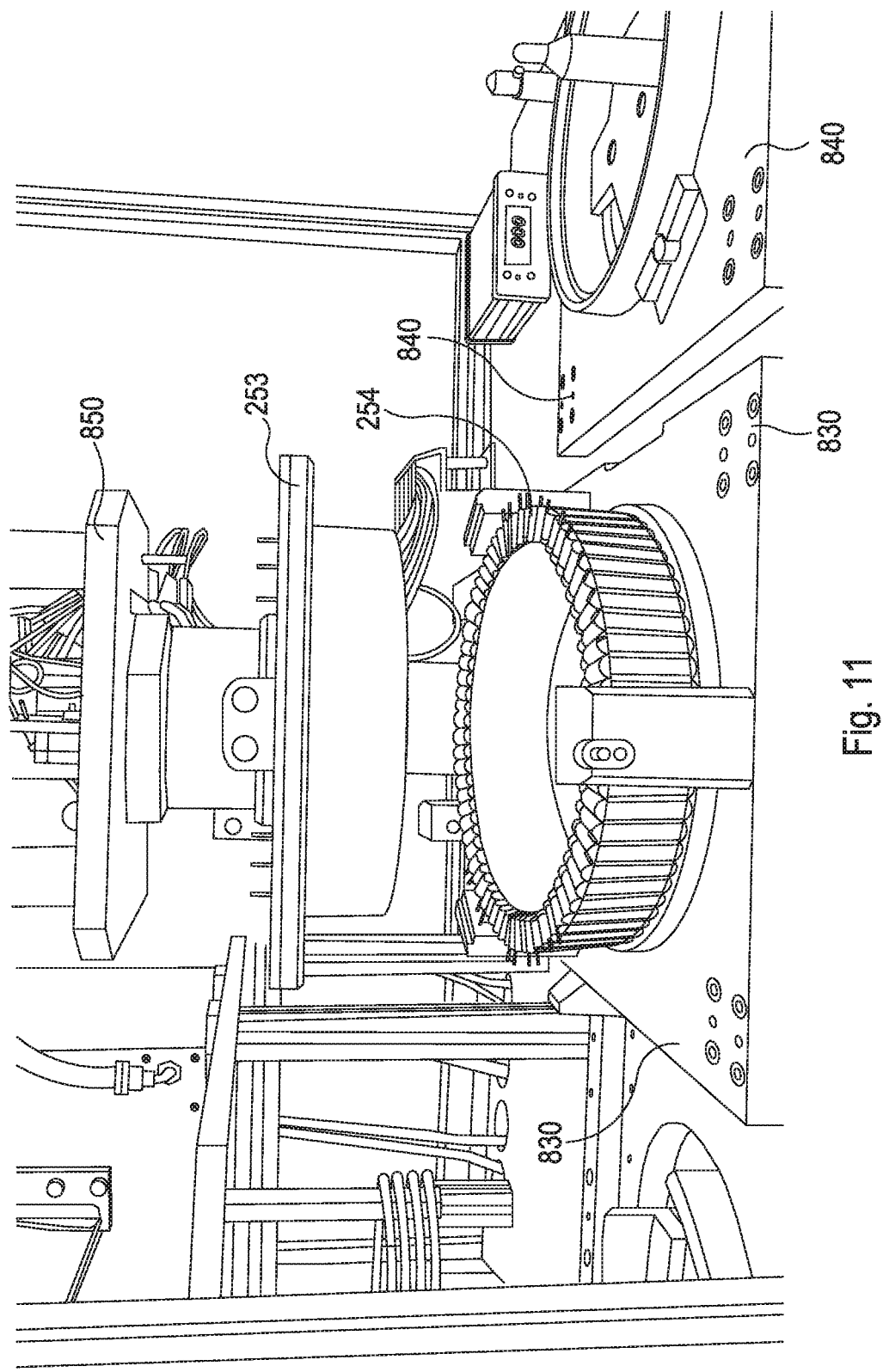

METHOD AND ARRANGEMENT FOR ASSEMBLING AN ELECTRIC MOTOR OR GENERATOR

The present invention relates to a method and arrangement for assembling an electric motor or generator, in particular the mounting of a back iron on or in a stator and the mounting of a back iron in or on a rotor.

Electric motors, and particularly in-wheel electric motors, contain a number of components that need to be securely connected or attached together. The connection must be secure, but there are further considerations because electric motors are often finely tuned for optimum operational characteristics. For example, the distance between the rotor and the stator, between which a magnetic field is generated, should ideally be uniform about the entirety of the rotor/stator. At the same time, electric motors are often exposed to heavy vibrations and must be able to operate satisfactorily under such conditions.

There are components of electric motors that have certain magnetic properties. These components, which will be referred to as magnetic components, may include the back iron of a stator or the back iron of a rotor. The materials of these components are chosen primarily for their magnetic properties, in particular having a low reluctance, for example electrical steel. Typically, to inhibit eddy currents resulting from flux flowing through the materials these components are usually manufactured using a number of laminations stacked together. It is often necessary to attach such magnetic components to corresponding structural components, whose materials are chosen primarily to exhibit other properties such as structural rigidity or good heat conductance. For example, the stator will typically include a magnetic component in the form of a back iron having a set of teeth wound with coil windings. The stator may also include a structural element such as a heat sink that is also arranged to conduct heat away from the stator teeth. Likewise, the rotor will typically include a set of permanent magnets mounted on a back iron that needs to be connected to a rotor housing.

One known solution for connecting together magnetic and structural components of an electric motor involves creating an interference fit between the respective components by heating up one of the components in an oven to a temperature that allows the component to be mounted on or over a circumferential mounting surface on the other component, whereupon cooling of the heated component the diameter of the component contracts around the circumferential mounting surface of the other component.

However, the process of heating the component in an oven can be time consuming and the need to remove the component from the oven increases the complexity of the manufacturing process.

It is desirable to improve this situation.

In accordance with an aspect of the present invention there is provided a method and arrangement according to the accompanying claims.

The present invention as claimed has the advantage of simplifying the manufacturing process for an electric motor or generator while also reducing the time required to assemble an electric motor or generator.

The present invention will now be described, by way of example, with reference to the accompanying drawings, in which:

FIG. 8 illustrates a stator assembly arrangement according to an embodiment of the present invention;

FIG. 9 illustrates a stator assembly arrangement according to an embodiment of the present invention;

FIG. 10 illustrates a stator assembly arrangement according to an embodiment of the present invention;

FIG. 11 illustrates a stator assembly arrangement according to an embodiment of the present invention.

The embodiment of the invention described is an arrangement for assembling a motor or generator by mounting an annular first element on or over a circumferential mounting surface of a second element. Examples of such elements include the mounting of a rotor housing on a back iron and the mounting of a back iron on a stator support element, for example a stator heat sink, for an outer rotor motor configuration.

Alternatively, the mounting of a back iron onto a rotor housing and the mounting of a stator support element on a back iron for an inner rotor motor configuration.

For the purposes of the present embodiment the electric motor being assembled is for use in a wheel of a vehicle, however the electric motor may be located anywhere within the vehicle. The motor is of the type arranged to include a set of coils being part of the stator for attachment to a vehicle, radially surrounded by the rotor carrying a set of magnets mounted on the back iron for attachment to a wheel. For the avoidance of doubt, the various aspects of the invention are equally applicable to the assembly of an electric generator having the same arrangement. As such, the definition of electric motor is intended to include electric generator. As would be appreciated by a person skilled in the art, the present invention is applicable for assembling other types of electric motors.

Figure 1:
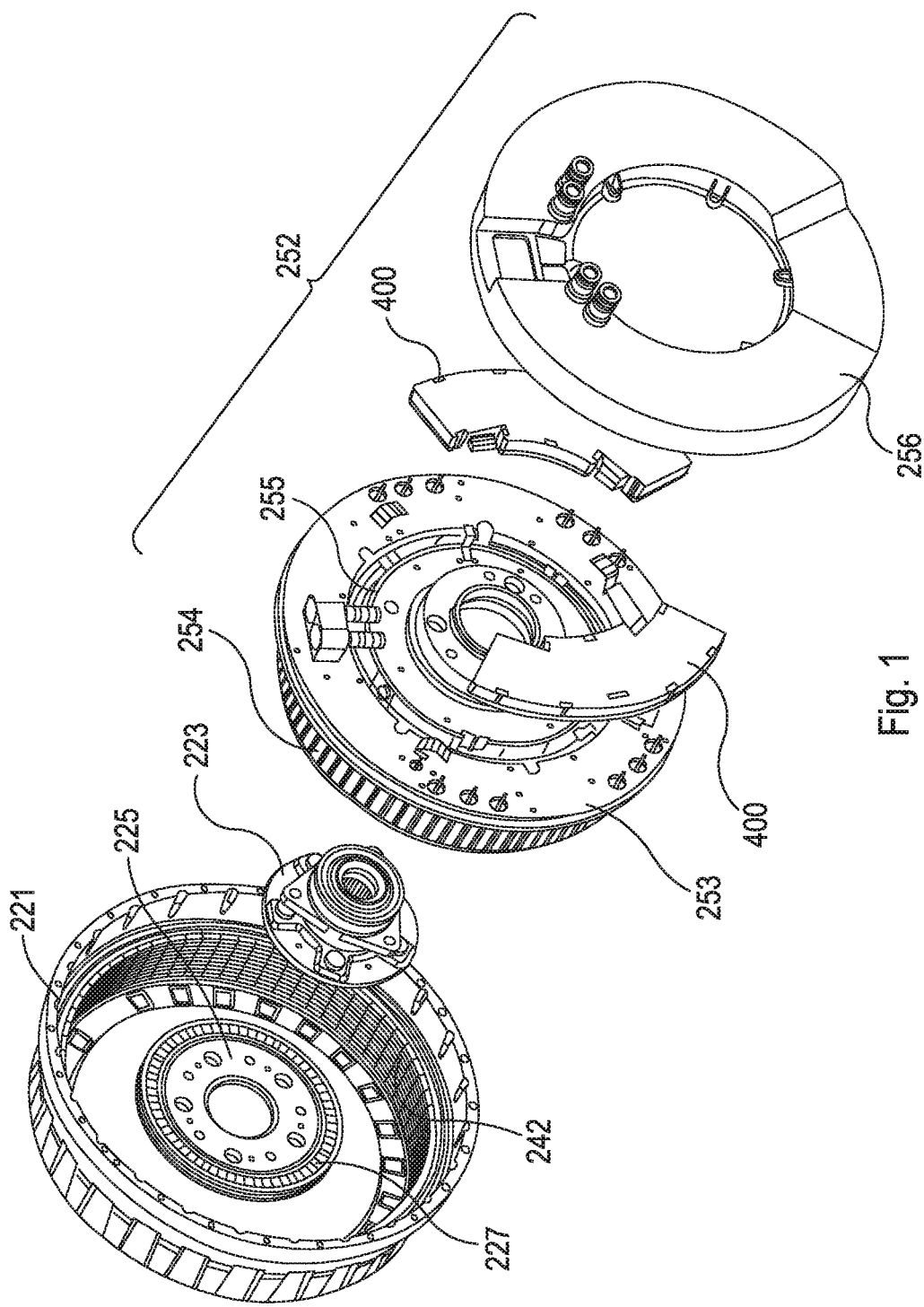
FIG. 1 illustrates an exploded view of an assembled electric motor.
Figure 2:
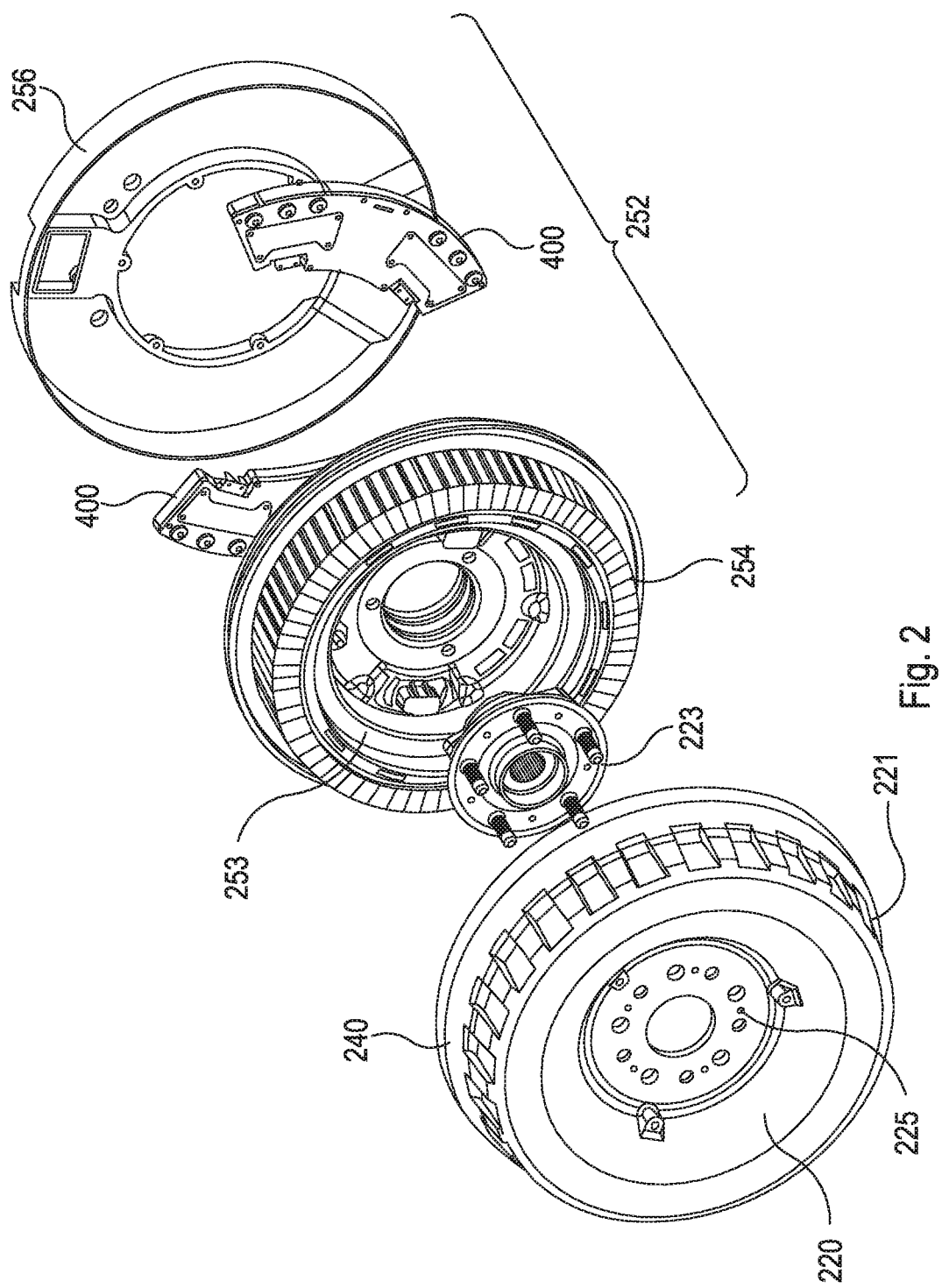
FIG. 2 is an exploded view of the motor of FIG. 1 from an alternative angle.

FIGS. 1 and 2 provide an illustration of an exploded view of a preferred electric motor having been assembled in accordance with the following embodiment. The in-wheel electric motor includes a stator 252 comprising a heat sink 253, a stator back iron mounted on the heat sink 253 having multiple coils 254 formed on stator tooth laminations to form coil windings, two control devices 400 mounted on the heat sink 253 on a rear portion of the stator for driving the coils, and an annular capacitor, otherwise known as a DC link capacitor, mounted on the stator within the inner radius of the control devices 400. A stator cover 256 is mounted on the rear portion of the stator 252, enclosing the control devices 400 to form the stator 252, which may then be fixed to a vehicle and does not rotate relative to the vehicle during use. The stator back iron is preferably formed from a series of circumferential laminations manufactured from a material having a high magnetic permeability, thereby allowing a magnetic field to be formed within the back iron for increasing magnetic flux. Examples of materials used for the back iron include iron or electrical steel (also known as lamination steel, silicon steel or transformer steel). The laminations are typically formed by stamping the desired shape from thin sheets of material, which may typically have a thickness of around 0.35 mm. Preferably the stator tooth laminations are either formed as part of the circumferential laminations or mounted onto the stator back iron after the assembly of the stator back iron.

A rotor 240 comprises a front portion 220 and a cylindrical portion 221 forming a cover, which substantially surrounds the stator 252. The rotor includes a back iron mounted on the inner surface of the cylindrical portion with a plurality of permanent magnets 242 mounted on the inner surface of the back iron and hence are arranged around the inside of the cylindrical portion 221. For the purposes of the present embodiment 32 magnet pairs are mounted on the inside of the cylindrical portion 221. However, any number of magnet pairs may be used. As with the stator back iron, the rotor back iron is preferably formed from a series of circumferential laminations manufactured from a material having a high permeability, for example electrical steel.

Figure 3:
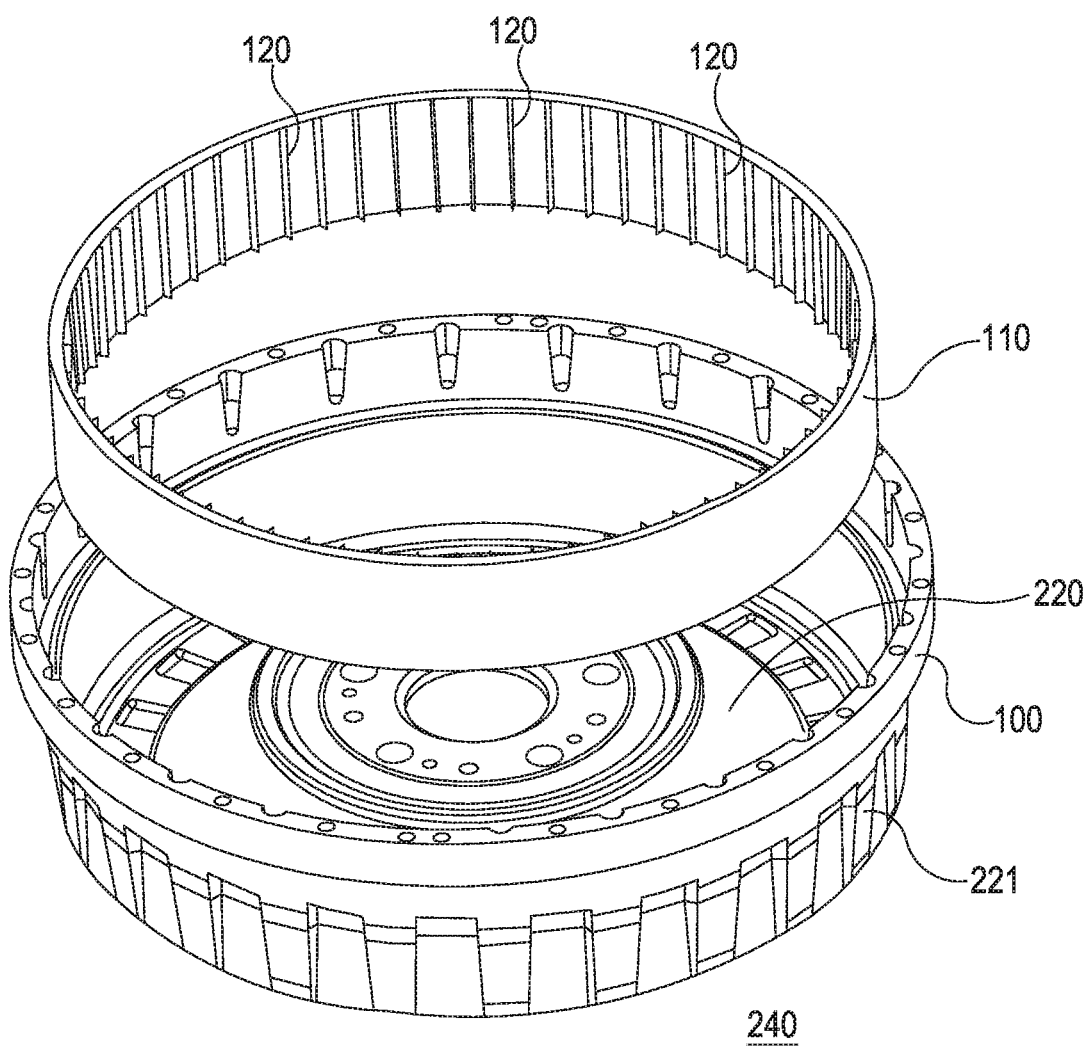
FIG. 3 illustrates an exploded view of a rotor according to an embodiment of the present invention.
Figure 4:
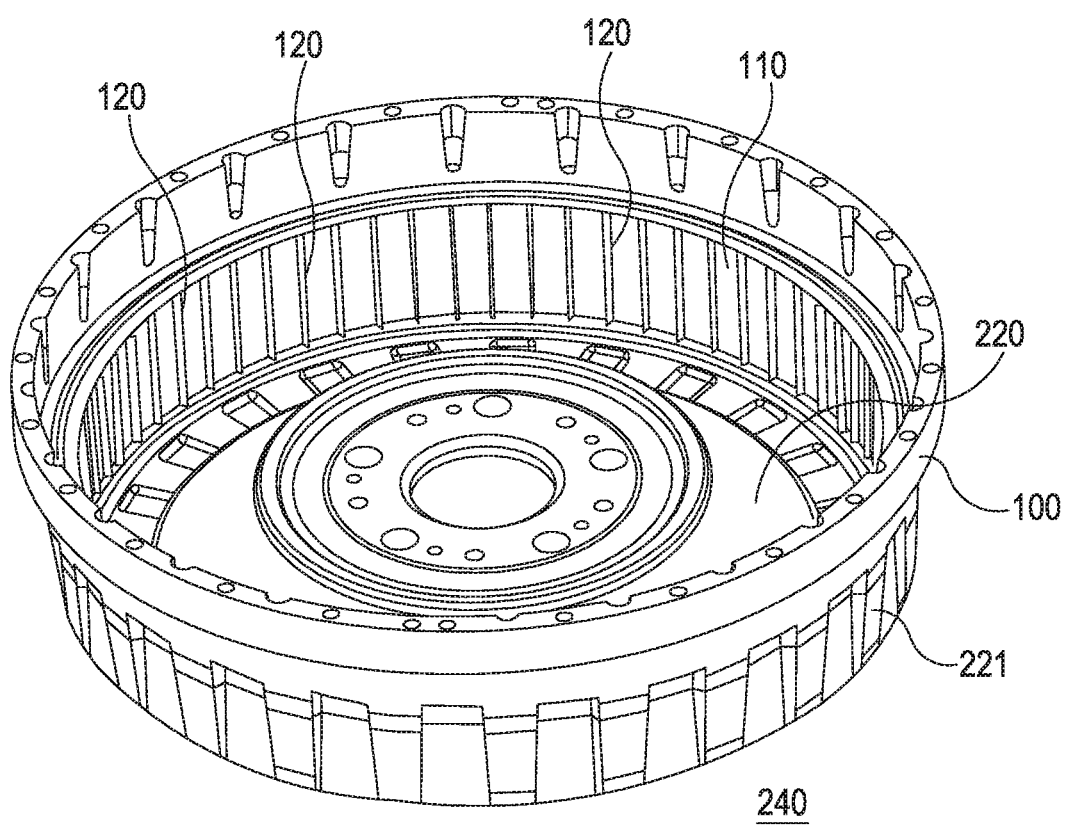
FIG. 4 illustrates a rotor according to an embodiment of the present invention.

As illustrated in FIGS. 3 and 4, the inner circumference of the back-iron 110 includes a plurality of ridges 120 extending from the axially inner and outer surface of the back-iron 110, where the ridges 120 project in a radial inward direction. The ridges 120 act as a spacer between magnet elements mounted on the inner circumference of the back-iron 110 that can also be used to facilitate the alignment of magnets mounted on the back-iron 110. A magnet is arranged to be mounted in between a pair of ridges 120 with adjacent magnets having alternate magnetic polarity.

Preferably, both the stator heat sink and the rotor housing are formed from aluminum or an alloy of aluminum, chosen to be structurally strong yet also light weight and corrosion resistant. However, alternative materials may be used, for example steel or magnesium alloy.

The magnets are arranged to be in close proximity to the coil windings on the stator 252 so that magnetic fields generated by the coils interact with the magnets 242 arranged around the inside of the cylindrical portion 221 of the rotor 240 to cause the rotor 240 to rotate with the respective rotor and stator back irons being utilised to complete the electric motors magnetic circuit. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 253 of the wall of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

FIG. 2 shows an exploded view of the same motor assembly illustrated in FIG. 1 from the opposite side. The rotor 240 comprises the outer rotor wall 220 and circumferential wall 221 within which the rotor back iron and magnets 242 are circumferentially arranged. As previously described, the stator 252 is connected to the rotor 240 via the bearing block at the central portions of the rotor and stator walls.

In the present embodiment the electric motor being assembled includes four coil sets with each coil set having three coil sub-sets that are coupled in a wye configuration to form a three phase sub-motor, resulting in the motor having four three phase sub-motors. The operation of the respective sub-motors is controlled via one of the two control devices 400. However, although the present embodiment describes an electric motor having four coil sets (i.e. four sub motors) the motor may equally have one or more coil sets with associated control devices. In a preferred embodiment the motor includes eight coil sets with each coil set having three coil sub-sets that are coupled in a wye configuration to form a three phase sub-motor, resulting in the motor having eight three phase sub-motors. Similarly, each coil set may have any number of coil sub-sets, thereby allowing each sub-motor to have two or more phases.

An embodiment for mounting the rotor back iron within the cylindrical portion of the rotor to produce an interference fit will now be described, where FIG. 3 illustrates the rotor back iron 110 and rotor housing prior to assembly and FIG. 4 illustrates the rotor back iron 110 and rotor housing after assembly.

The outer radial surface of the back iron 110 is arranged to have the same or slightly larger diameter than the inner surface of the cylindrical portion 221 of the rotor housing when both the back iron 110 and the rotor housing are at the same temperature, which prevents the back iron 110 from fitting within the circumferential portion 221 of the rotor housing when both items are at the same temperature.

When producing the interference fit it is necessary to heat up one of the components to cause expansion. The temperature to which the component is heated depends upon a number of factors including the degree of expansion required to generate a clearance, the thermal expansion coefficient of the material and the safe temperature to which the material can be heated.

The following embodiment describes the arrangement for heating of the rotor housing, which results in an increased diameter of the inner surface of the cylindrical portion 221 of the rotor housing, thereby allowing the back iron 110 to fit within the cylindrical portion of the rotor housing, and the subsequent assembly of the rotor housing and back iron 110.

Figure 5:
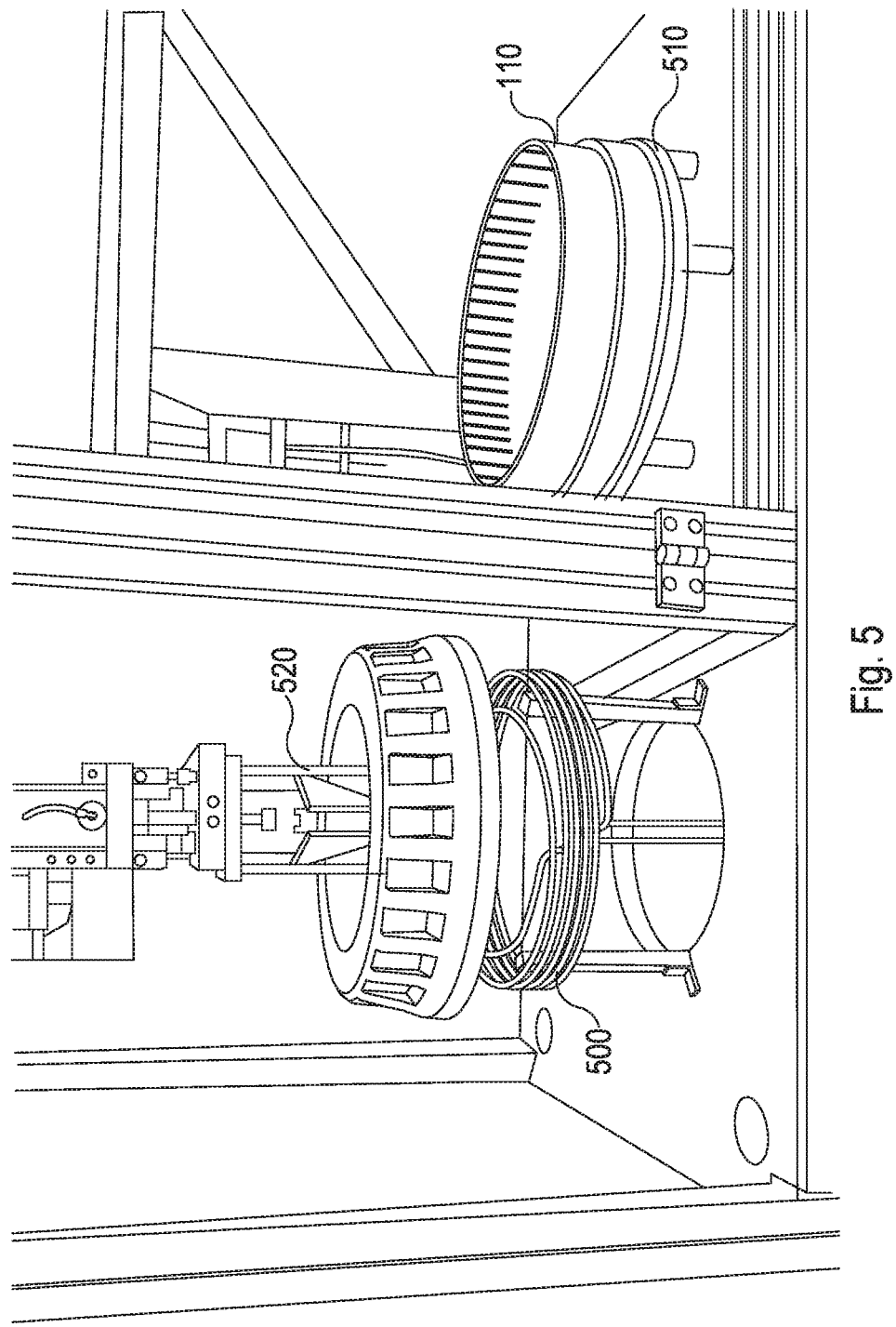
FIG. 5 illustrates a rotor assembly arrangement according to an embodiment of the present invention.

FIG. 5 illustrates the heating and mounting arrangement for assembling the rotor housing and the rotor back iron, which includes a circular induction coil having a diameter arranged to fit within the inner surface of the circumferential portion of the rotor housing, a first mounting station 510 upon which is mounted the rotor back iron 110 and a second mounting station 520 to which is attached the rotor housing.

Prior to assembly of the rotor back iron 110 to the rotor housing, the axial height of the rotor back iron 110 is determined to allow the axial position of the rotor back iron 110 to be placed at a predetermined position within the circumferential portion 221 of the rotor housing. Any suitable means may be used for determining the axial height.

As illustrated in FIG. 5, the rotor back iron 110 is placed on the first mounting station 510, where the first mounting station 510 is maintained in a fixed position. To simplify and speed up the assembly process the induction coil 500 is positioned adjacent to the rotor back iron 110 and placed in a similar orientation to the rotor back iron 110.

The second mounting station 520 is attached to a robotic arm, with the front portion 220 of the rotor housing being attached to a bottom portion of the second mounting station 520. Any suitable means for attaching the rotor housing to the second mounting station 520 may be used, for example using wheel bearing fixings. The robotic arm is capable of moving in both vertical and horizontal directions.

To heat the inner surface of the cylindrical portion 221 of the rotor housing the robotic arm is arranged to place the rotor housing over the induction coil 500 so that the cylindrical portion 221 of the rotor housing substantially surrounds the induction coil 500. In this configuration the outer axial surface of the induction coil 500 is in close proximity to the inner surface of the cylindrical portion 221 of the rotor housing.

By placing the induction coil 500 within the cylindrical portion 221 of the rotor housing allows the heat to be focused within this area, thereby decreasing the time required for the diameter of the cylindrical portion 221 of the rotor housing to increase in size sufficiently to allow the rotor back iron 110 to fit within the cylindrical portion 221 of the rotor housing and correspondingly also requires less energy.

Current is applied to the induction coil 500 to cause the inner surface of the cylindrical portion 221 of the rotor to heat up, while the rotor back iron 110 is maintained at or near room temperature. Within the present embodiment the induction coil acts as a heating coil, accordingly any form of heating coil may be used that is mountable within the rotor to allow the inner surface of the cylindrical portion 221 of the rotor to heat up. Alternatively, the rotor can include material that will allow electrical conduction, where an induction coil is arranged to generate heat within the rotor by the generation of eddy currents within the rotor.

Typically the inner surface of the cylindrical portion 221 of the rotor housing may need to be heated to between 100° C. to 200° C., but preferably to approximately 180° C., with a temperature sensor, for example an infrared thermometer, being used to determine when the inner surface of the cylindrical portion 221 of the rotor housing is at the required temperature.

When the inner surface of the cylindrical portion 221 of the rotor housing has reached the required temperature the robotic arm raises the second mounting station 520 with the rotor housing attached and moves the rotor housing above the rotor back iron 110 so that the rotor housing and the rotor back iron 110 are axially aligned. The robotic arm then lowers the rotor housing around the rotor back iron 110 so that the cylindrical portion 221 of the rotor housing substantially surrounds the rotor back iron 110, where the rotor back iron 110 is positioned in an axial predetermined position within the cylindrical portion 221 of the rotor housing based on the axial height of the rotor back iron 110. This ensures that the position of the front edge of the rotor back iron 110 is placed in a predetermined position within the cylindrical portion 221 of the rotor housing.

To create the contraction required to from the interference fit, the rotor housing can be allowed to cool down to room temperature, or active cooling can be used.

Figure 6:
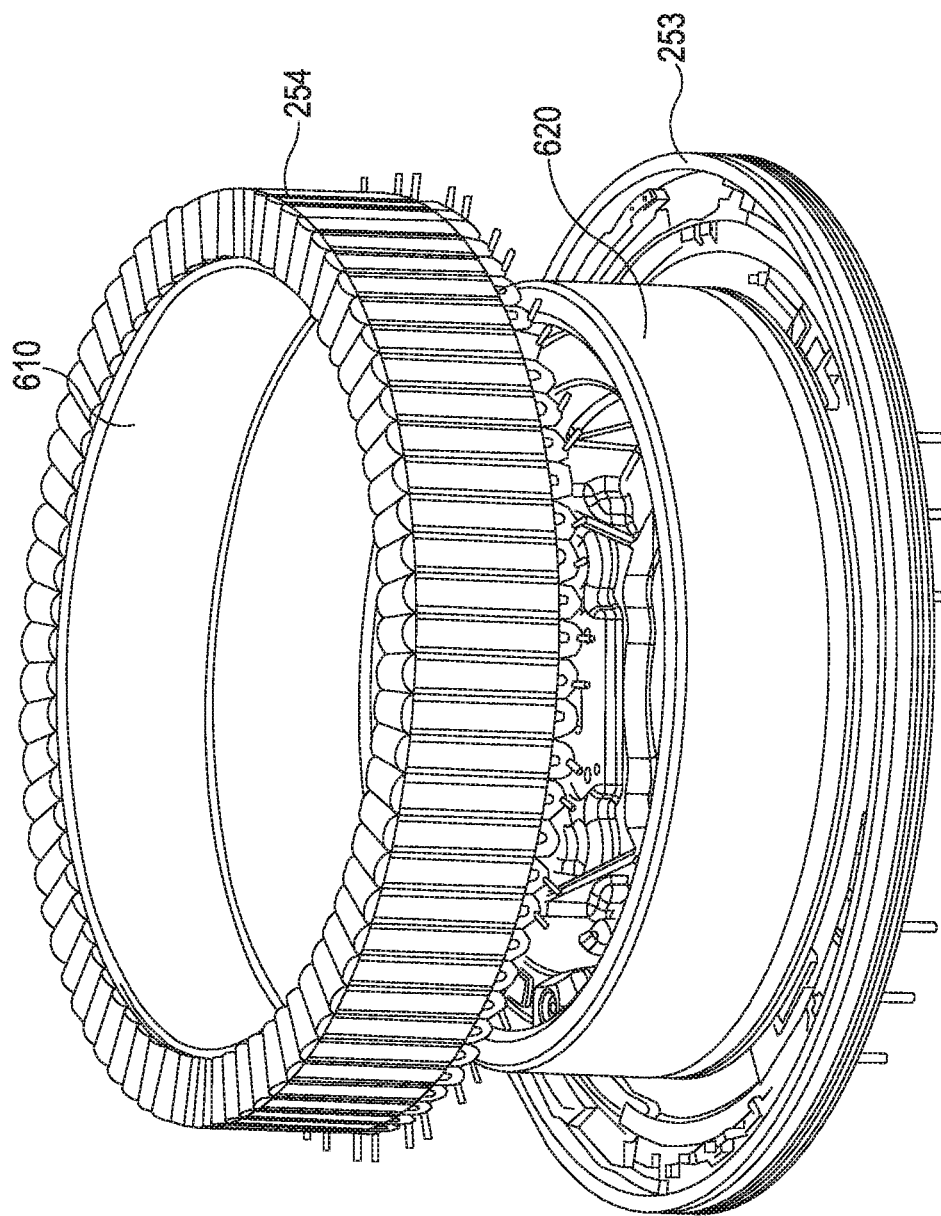
FIG. 6 illustrates an exploded view of a stator according to an embodiment of the present invention.
Figure 7:
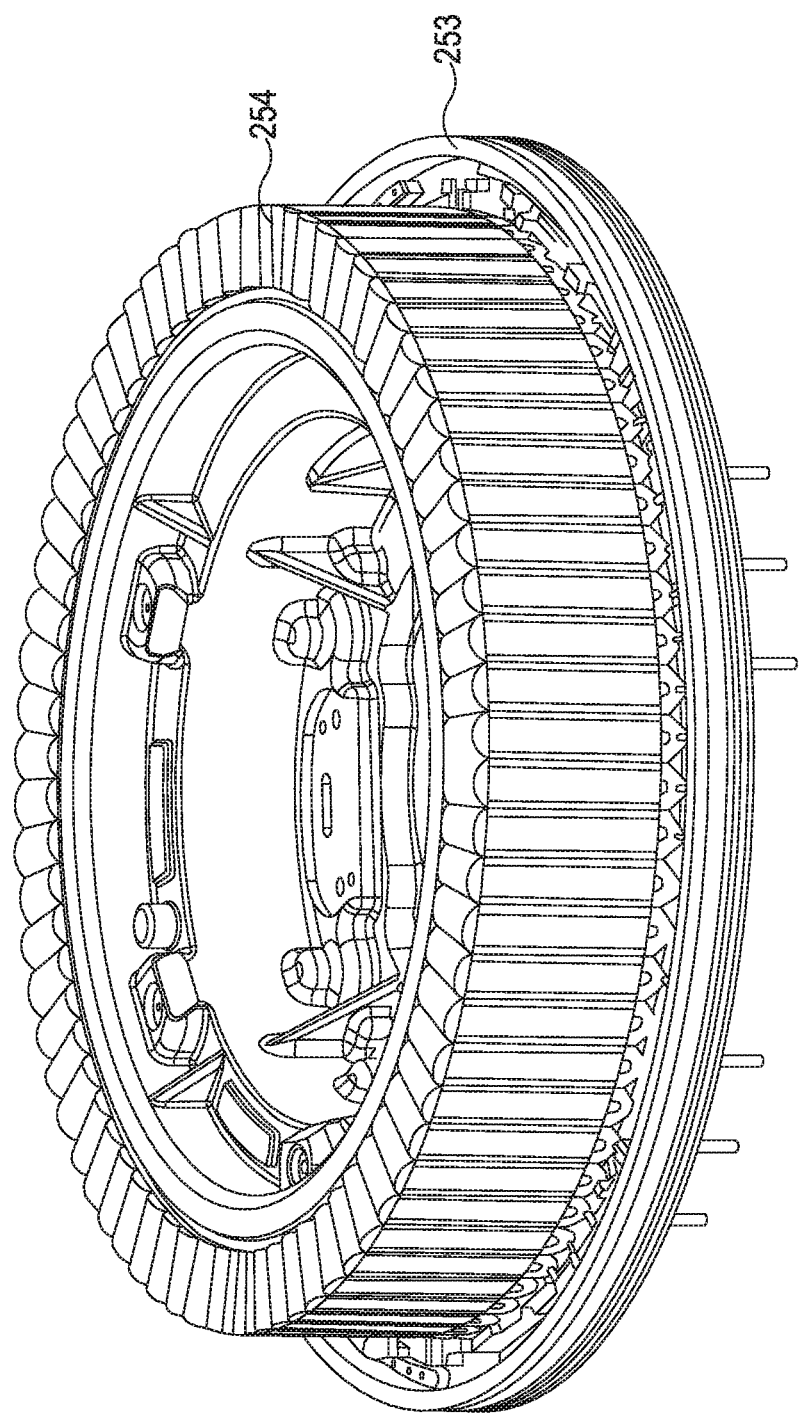
FIG. 7 illustrates a stator according to an embodiment of the present invention.

An embodiment for mounting the stator back iron 610 around the circumferential mounting surface 620 of the stator heat sink 253 to produce an interference fit will now be described, where FIG. 6 illustrates the stator back iron 610 and stator heat sink 253 prior to assembly and FIG. 7 illustrates the stator back iron 610 and stator heat sink 253 after assembly. As illustrated in FIGS. 6 and 7, the stator back iron 610 includes stator teeth on the outer circumferential surface with coil windings 254 mounted on the stator teeth.

The inner radial surface of the stator back iron 610 is arranged to have the same or slightly smaller diameter than the circumferential mounting surface 620 of the stator heat sink 253 when both the stator back iron 610 and the stator heat sink 253 are at the same temperature, which prevents the stator back iron 610 from fitting around the circumferential mounting surface 620 of the stator heat sink 253 when both items are at the same temperature.

When producing the interference fit it is necessary to heat up one of the components to cause expansion. The temperature to which the component is heated depends upon a number of factors including the degree of expansion required to generate a clearance, the thermal expansion coefficient of the material and the safe temperature to which the material can be heated.

The following embodiment describes the arrangement for heating of the stator back iron 610, which results in an increased diameter of the inner surface of the stator back iron 610, thereby allowing the back iron 610 to fit around the circumferential mounting surface 620 of the stator heat sink 253, and the subsequent assembly of the stator heat sink 253 and stator back iron 610.

FIG. 8 illustrates the heating and mounting arrangement for assembling the stator heat sink 253 and the stator back iron 610, illustrated in FIG. 6, having multiple coils 254 formed on stator tooth laminations. The heating and mounting arrangement includes a circular induction coil 810 having a diameter arranged to fit within the inner surface of the stator back iron 610, as illustrated in FIG. 9. As also illustrated in FIG. 8, there is shown a first mounting station 830 upon which is mounted the stator back iron 610, a second mounting station 840 to which is mounted the stator heat sink 253, and a third mounting station 850 to which the stator heat sink 253 is attached when the stator back iron 610 is being mounted onto the stator heat sink 253, as described below.

For the purposes of the present embodiment, the first mounting station 830 and the second mounting station 840 are arranged to move in both a horizontal and a vertical direction, with the circular induction coil 810 and the third mounting station 850 being maintained in a fixed position.

Prior to assembly of the stator back iron 610 to the stator heat sink 253, the axial height of the stator back iron 610 is determined to allow the axial position of the stator back iron 610 to be placed at a predetermined position on the circumferential mounting surface 620 of the stator heat sink 253. Any suitable means may be used for determining the axial height. For example, in one embodiment, with the stator back iron 610 placed on the first mounting station 830, and positioned below the third mounting station 850, the first mounting station 830 is raised until the upper axial edge of the stator back iron 610 comes into contact with one or more contact points 1010 on the third mounting station 850, as illustrated in FIG. 10. Using height information associated with the position of the third mounting station 850 and the first mounting station 830, the axial height of the stator back iron 610 is determined.

With the stator back iron 610 placed on the first mounting station 830 and the stator heat sink 253 placed on the second mounting station 840, the first mounting station 830 and the second mounting station 840 are positioned under the induction coil 810 and the third mounting station 850 respectively, as illustrated in FIG. 8.

The inner surface of the stator back iron 610 is heated by raising the first mounting station 830 so that the inner cylindrical portion of the stator back iron 610 substantially surrounds the induction coil 810. In this configuration the outer axial surface of the induction coil 810 is in close proximity to the inner surface of the inner cylindrical portion of the stator back iron 610.

By placing the induction coil 810 within the cylindrical portion of the stator back iron 610 allows the heat generated by the induction coil 810 to be focused within this area, thereby decreasing the time required for the diameter of the cylindrical portion of the stator back iron 610 to increase in size sufficiently to allow the stator back iron 610 to fit on or over the cylindrical mounting surface of the stator heat sink 253 and correspondingly also requires less energy.

Current is applied to the induction coil 810 to cause the inner surface of the cylindrical portion of the stator back iron 610 to heat up, while the stator heat sink 253 is maintained at or near room temperature.

Typically the inner surface of the cylindrical portion of the stator back iron 610 may need to be heated to between 100° C. to 200° C., but preferably to approximately 180° C., with a temperature sensor, for example an infrared thermometer, being used to determine when the inner surface of the cylindrical portion of the stator back iron 610 is at the required temperature.

While the inner surface of the cylindrical portion of the stator back iron 610 is being heated, the second mounting station 840 moves upward to bring the stator heat sink 253 into contact with the third mounting station 850. When the second mounting station 840 has been raised to a predetermined height the third mounting station 850 automatically couples itself to the stator heat sink 253.

When the inner surface of the cylindrical portion of the stator back iron 610 has reached the required temperature the first mounting station 830 lowers the stator back iron 610 and moves horizontally under the stator heat sink 253 so that the stator heat sink 253 and the stator back iron 610 are axially aligned, as illustrated in FIG. 11. The first mounting station 830 then raises the stator back iron 610 over the circumferential mounting surface 620 of the stator heat sink 253 so that the inner surface of cylindrical portion of the stator back iron 610 substantially surrounds the circumferential mounting surface 620 of the stator heat sink 253. The stator back iron 610 is positioned in an axial predetermined position on the cylindrical mounting surface 620 of the stator heat sink 253 based on the axial height of the stator back iron 610. This ensures that the position of the front axial edge of the stator back iron 610 is placed in a predetermined position on the cylindrical mounting surface 620 of the stator heat sink 253.

To create the contraction required to create the interference fit the stator back iron 610 can be allowed to cool down to room temperature, or active cooling can be used. With tolerances, preferably, there will be interference (i.e. constant contact) between the stator back-iron 610 and stator heat sink 253. By way of illustration, preferably the difference between the outer diameter of the stator heat sink 253 and the inner diameter of the stator back iron 610 will be in the region of 0.070 mm to 0.176 mm, where typically this interference will provide an average slip (break) torque of 1933 Nm.

For the stator heat sink 253 and stator back iron 610, the interference fit will preferably give rise to an interference fit of 0.013 to 0.213 mm (that is, the difference between the inner diameter of the stator back iron 610 and the outer diameter of the circumferential mounting surface of the stator heat sink 253, which will provide an average slip (break) torque of 1290 Nm.

Although the present embodiment describes a method of assembling an outer rotor motor configuration, the method is equally applicable to an inner rotor motor configuration, where a first back-iron is mounted over an inner rotor and a second back-iron is mounted within an annular outer stator.

The invention claimed is:

1. A method of assembling an electric motor or generator having an annular first element mounted on a circumferential mounting surface of a second element, the method comprising:
   measuring the axial height of the annular first element;
   placing a heating coil within an inner annular surface of the annular first element;
   applying a current to the heating coil to heat the inner annular surface of the annular first element to a temperature that results in the inner annular surface of the annular first element increasing in diameter to allow the annular first element to be mounted on or over the circumferential mounting surface of the second element;
   mounting the annular first element on or over the circumferential mounting surface of the second element; and
   cooling the annular first element to form an interference fit between the annular first element and the circumferential mounting surface of the second element,
   wherein the mounting of the annular first element on or over the circumferential mounting surface of the second element involves axially positioning the annular first element on the circumferential mounting surface dependent upon the axial height of the annular first element; and
   wherein:
      the annular first element is a back iron and the second element is a stator support element; or
      the annular first element is the stator support element and the second element is the back iron.

2. A method according to claim 1, wherein the heating coil is an induction coil.

3. A method according to claim 1, wherein the back iron is arranged to receive rotor magnets.

4. A method according to claim 1, wherein the back iron includes or is arranged to receive stator teeth.

5. A method according to claim 1, wherein the back iron is formed from electrical steel and is arranged to form part of a magnetic circuit within the electric motor or generator.

6. A method according to claim 1, wherein the back iron includes a plurality of circumferential laminations of electrical steel.

7. A method according to claim 1, wherein the diameter of the inner annular surface of the annular first element is equal to or smaller than the diameter of the circumferential mounting surface of the second element when the annular first element and the second element are at the same temperature.

8. A method according to claim 1, further comprising mounting the annular first element on the circumferential mounting surface of the second element at a predetermined radial position to allow electrical coupling of coil windings mounted on the annular first element to a control device mounted on the second element.

9. An arrangement for assembling an electric motor or generator having an annular first element mounted on a circumferential mounting surface of a second element, the arrangement comprising:
   means for measuring the axial height of the annular first element;
   means for placing a heating coil within an inner annular surface of the annular first element;
   means for applying a current to the heating coil to heat the inner annular surface of the annular first element to a temperature that results in the inner annular surface of the annular first element increasing in diameter to allow the annular first element to be mounted on or over the circumferential mounting surface of the second element;

means for mounting the annular first element on or over the circumferential mounting surface of the second element; and means for cooling the annular first element to form an interference fit between the annular first element and the circumferential mounting surface of the second element, wherein the mounting of the annular first element on or over the circumferential mounting surface of the second element involves axially positioning the annular first element on the circumferential mounting surface dependent upon the axial height of the annular first element, wherein:
the annular first element is a back iron and the second element is a stator support element; or
the annular first element is a stator support element and the second element is a back iron.

10. An arrangement according to claim 9, wherein the heating coil is an induction coil.

11. An arrangement according to claim 9, wherein the back iron is arranged to receive rotor magnets.

12. An arrangement according to claim 9, wherein the back iron includes or is arranged to receive stator teeth.

13. An arrangement according to claim 9, wherein the back iron is formed from electrical steel and is arranged to form part of a magnetic circuit within the electric motor or generator.

14. An arrangement according to claim 9, wherein the back iron includes a plurality of circumferential laminations of electrical steel.

15. An arrangement according to claim 9, wherein the diameter of the inner annular surface of the annular first element is smaller than the diameter of the circumferential mounting surface of the second element when the annular first element and the second element are at the same temperature.

16. An arrangement according to claim 9, further comprising means for mounting the annular first element on the circumferential mounting surface of the second element at a predetermined radial position to allow electrical coupling of coil windings mounted on the annular first element to a control device mounted on the second element.

17. A method of assembling an electric motor or generator having an annular first element mounted on a circumferential mounting surface of a second element, the method comprising:

measuring the axial height of the annular first element;

placing a heating coil within an inner annular surface of the annular first element;

applying a current to the heating coil to heat the inner annular surface of the annular first element to a temperature that results in the inner annular surface of the annular first element increasing in diameter to allow the annular first element to be mounted on or over the circumferential mounting surface of the second element;

mounting the annular first element on the circumferential mounting surface of the second element at a predetermined radial position to allow electrical coupling of coil windings mounted on the annular first element to a control device mounted on the second element; and cooling the annular first element to form an interference fit between the annular first element and the circumferential mounting surface of the second element, wherein the mounting of the annular first element on or over the circumferential mounting surface of the second element involves axially positioning the annular first element on the circumferential mounting surface dependent upon the axial height of the annular first element.

18. A method according to claim 17, wherein the heating coil is an induction coil.

19. A method according to claim 17, wherein:
the annular first element is a back iron and the second element is a stator support element; or
the annular first element is a stator support element and the second element is a back iron.

20. A method according to claim 17, wherein:
the annular first element is a rotor and the second element is a back iron; or
the annular first element is a back iron and the second element is a rotor.

21. A method according to claim 20, wherein the back iron is arranged to receive rotor magnets.

22. A method according to claim 19, wherein the back iron includes or is arranged to receive stator teeth.

23. A method according to claim 19, wherein the back iron is formed from electrical steel, wherein the back iron is arranged to form part of a magnetic circuit within the electric motor or generator.

24. A method according to claim 19, wherein the back iron includes a plurality of circumferential laminations of electrical steel.

* * * * *